US010067337B2

(12) United States Patent
Bailey et al.

(10) Patent No.: US 10,067,337 B2
(45) Date of Patent: Sep. 4, 2018

(54) SYSTEMS, DEVICES, AND METHODS FOR WEARABLE HEADS-UP DISPLAYS

(71) Applicant: THALMIC LABS INC., Kitchener (CA)

(72) Inventors: Matthew Bailey, Kitchener (CA); Stefan Alexander, Elmira (CA)

(73) Assignee: THALMIC LABS INC., Kitchener (CA)

( * ) Notice: Subject to any disclaimer, the term of this patent is extended or adjusted under 35 U.S.C. 154(b) by 0 days.

(21) Appl. No.: 15/679,837

(22) Filed: Aug. 17, 2017

(65) Prior Publication Data

US 2017/0343796 A1 Nov. 30, 2017

Related U.S. Application Data

(63) Continuation of application No. 14/749,351, filed on Jun. 24, 2015, now Pat. No. 9,766,449.
(Continued)

(51) Int. Cl.
*G02B 26/10* (2006.01)
*G02B 27/30* (2006.01)
*G02B 27/01* (2006.01)

(52) U.S. Cl.
CPC .......... *G02B 26/10* (2013.01); *G02B 27/017* (2013.01); *G02B 27/0176* (2013.01);
(Continued)

(58) Field of Classification Search
None
See application file for complete search history.

(56) References Cited

U.S. PATENT DOCUMENTS 3,408,133 A 10/1968 Lee
3,712,716 A 1/1973 Cornsweet et al.
(Continued)

FOREIGN PATENT DOCUMENTS

JP 61-198892 A 9/1986
JP 2013-127489 A 6/2013
(Continued)

OTHER PUBLICATIONS

Amitai, Yaakov, "P-27: A Two-dimensional Aperture Expander for Ultra-Compact, High-Performance Head-Worn Displays," *SID Symposium Digest of Technical Papers*, vol. 36, No. 1 (2005), pp. 360-363.
(Continued)

*Primary Examiner* — Kenneth B Lee, Jr.
(74) *Attorney, Agent, or Firm* — Seed IP Law Group LLP

(57) ABSTRACT

Systems, devices, and methods for transparent displays that are well-suited for use in wearable heads-up displays are described. Such transparent displays include a light source that sequentially generates pixels or other discrete portions of an image. Respective modulated light signals corresponding to the respective pixels/portions are sequentially directed towards at least one dynamic reflector positioned on a lens of the transparent display within the user's field of view. The dynamic reflector (such as a MEMS-based digital micromirror) scans the modulated light signals directly over the user's eye and into the user's field of view. Successive portions of the image are generated in rapid succession until the entire image is displayed to the user.

8 Claims, 11 Drawing Sheets

Related U.S. Application Data

(60) Provisional application No. 62/017,089, filed on Jun. 25, 2014, provisional application No. 62/053,598, filed on Sep. 22, 2014, provisional application No. 62/117,316, filed on Feb. 17, 2015.

(52) U.S. Cl.
CPC ........ *G02B 27/30* (2013.01); *G02B 2027/015* (2013.01); *G02B 2027/0154* (2013.01); *G02B 2027/0178* (2013.01); *G02B 2027/0187* (2013.01)

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,231,674 A | 7/1993 | Cleveland et al. | |
| 5,467,104 A | 11/1995 | Furness, III et al. | |
| 5,589,956 A | 12/1996 | Morishima et al. | |
| 5,596,339 A | 1/1997 | Furness, III et al. | |
| 5,742,421 A | 4/1998 | Wells et al. | |
| 6,008,781 A | 12/1999 | Furness, III et al. | |
| 6,027,216 A | 2/2000 | Guyton et al. | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,377,277 B1 | 4/2002 | Yamamoto | |
| 6,639,570 B2 | 10/2003 | Furness, III et al. | |
| 6,972,734 B1 | 12/2005 | Ohshima et al. | |
| 7,473,888 B2 | 1/2009 | Wine et al. | |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,477,079 B2 | 10/2016 | Bailey et al. | |
| 9,766,449 B2 * | 9/2017 | Bailey ............... | G02B 26/10 |
| 2001/0033402 A1 | 10/2001 | Popovich | |
| 2002/0003627 A1 | 1/2002 | Rieder | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2005/0012715 A1 | 1/2005 | Ford | |
| 2006/0238707 A1 | 10/2006 | Elvesjo et al. | |
| 2007/0078308 A1 | 4/2007 | Daly | |
| 2007/0132785 A1 | 6/2007 | Ebersole, Jr. et al. | |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 | 3/2010 | Sugiyama et al. | |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0239776 A1 | 9/2010 | Yajima et al. | |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |
| 2015/0325202 A1 | 11/2015 | Lake et al. | |
| 2015/0362734 A1 | 12/2015 | Moser et al. | |
| 2015/0378162 A1 | 12/2015 | Bailey et al. | |
| 2016/0033771 A1 | 2/2016 | Tremblay et al. | |
| 2016/0202081 A1 | 7/2016 | Debieuvre et al. | |
| 2016/0238845 A1 | 8/2016 | Alexander et al. | |
| 2016/0274365 A1 | 9/2016 | Bailey et al. | |
| 2016/0274758 A1 | 9/2016 | Bailey | |
| 2016/0327796 A1 | 11/2016 | Bailey et al. | |
| 2016/0327797 A1 | 11/2016 | Bailey et al. | |
| 2016/0349514 A1 | 12/2016 | Alexander et al. | |
| 2016/0349515 A1 | 12/2016 | Alexander et al. | |
| 2016/0349516 A1 | 12/2016 | Alexander et al. | |
| 2016/0377865 A1 | 12/2016 | Alexander et al. | |
| 2016/0377866 A1 | 12/2016 | Alexander et al. | |
| 2017/0068095 A1 | 3/2017 | Holland et al. | |
| 2017/0097753 A1 | 4/2017 | Bailey et al. | |
| 2017/0115483 A1 | 4/2017 | Aleem et al. | |
| 2017/0153701 A1 | 6/2017 | Mahon et al. | |
| 2017/0205876 A1 | 7/2017 | Vidal et al. | |
| 2017/0212290 A1 | 7/2017 | Alexander et al. | |
| 2017/0212349 A1 | 7/2017 | Bailey et al. | |
| 2017/0219829 A1 | 8/2017 | Bailey | |
| 2017/0299956 A1 | 10/2017 | Holland et al. | |
| 2017/0343797 A1 | 11/2017 | Bailey et al. | |
| 2018/0007255 A1 | 1/2018 | Tang | |

FOREIGN PATENT DOCUMENTS

| | | |
|---|---|---|
| JP | 2013-160905 A | 8/2013 |
| WO | 2014/155288 A2 | 10/2014 |
| WO | 2015/123775 A1 | 8/2015 |

OTHER PUBLICATIONS

Ayras et al., "Exit pupil expander with a large field of view based on diffractive optics," *Journal of the SID*, vol. 17, No. 8 (2009), pp. 659-664.

Chellappan et al., "Laser-based display: a review," *Applied Optics*, vol. 49, No. 25 (2010), pp. 79-98.

Cui et al., "Diffraction from angular multiplexing slanted volume hologram gratings," *Optik*, vol. 116 (2005), pp. 118-122.

(56) References Cited

OTHER PUBLICATIONS

Curatu et al., "Dual Purpose Lens for an Eye-tracked Projection Head-Mounted Display," *International Optical Design Conference 2006*, SPIE—OSA, vol. 6342 (2007), pp. 63420X-1-63420X-7.

Curatu et al., "Projection-based head-mounted display with eye-tracking capabilities," *Proc. of SPIE*, vol. 5875 (2005), pp. 58750J-1-58750J-9.

Essex, Doug, "Tutorial on Optomechanical Beam Steering," College of Optical Sciences, University of Arizona (2006).

Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.

Hainich et al., "Chapter 10: Near-Eye Displays," In: *Displays—Fundamentals & Applications* (2011).

Hornstein et al., "Maradin's Micro-Mirror—System Level Synchronization Notes," *SID 2012 Digest* (2012), pp. 981-984.

International Search Report and Written Opinion, dated Apr. 25, 2017, for International Application No. PCT/US2016/067246, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

International Search Report, dated Jun. 8, 2016, for PCT/US2016/018293, 19 pages.

International Search Report, dated Jun. 8, 2016, for PCT/US2016/018298, 16 pages.

International Search Report, dated Jun. 8, 2016, for PCT/US2016/018299, 14 pages.

Itoh et al., "Interaction-free calibration for optical see-through head-mounted displays based on 3D eye localization," *2014 IEEE Symposium on 3D User Interfaces* (3DUI), (2014), pp. 75-82.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Kessler, Dave, "Optics of Near to Eye Displays (NEDs)," Presentation—Oasis 2013, Tel Aviv (Feb. 19, 2013).

Kress et al., "Diffractive and Holographic Optics as Optical Combiners in Head Mounted Displays," *Proceedings of the 2013 ACM Conference on Pervasive and Ubiquitous Computing Adjunct Publication* (2013), pp. 1479-1482.

Kress et al., "A review of head-mounted displays (HMD) technologies and applications for consumer electronics," *Proc. of SPIE*, vol. 8720 (2013), pp. 87200A-1-87200A-13.

Kress, Bernard, "Optical architectures for see-through wearable displays," Presentation—Bay Area—SID Seminar, Bay Area (Apr. 30, 2014).

Levola, Tapani, "7.1: Invited Paper: Novel Diffractive Optical Components for Near to Eye Displays," *SID Symposium Digest of Technical Papers*, vol. 37, No. 1 (2006), pp. 64-67.

Liao et al., "The Evolution of MEMS Displays," *IEEE Transcations on Industrial Electronics*, vol. 56, No. 4 (2009), pp. 1057-1065.

Lippert, Thomas M., "Chapter 6: Display Devices: RSD (Retinal Scanning Display)," In: *The Avionics Handbook* (2001).

Majaranta et al., "Chapter 3 Eye-Tracking and Eye-Based Human-Computer Interaction," In *Advances in Physiological Computing* (2014), pp. 17-39.

Merriam-Webster, "Radio Frequencies" retrieved from https://www.merriam-webster.com/table/collegiate/radiofre.htm, retrieved on Jul. 12, 2017, 2 pages.

Schowengerdt et al., "Stereoscopic retinal scanning laser display with integrated focus cues for ocular accommodation" *Proc. of SPIE—IS&T Electronic Imaging*, vol. 5291 (2004), pp. 366-376.

Silverman et al., "58.5L: Late-News Paper: Engineering a Retinal Scanning Laser Display with Integrated Accommodative Depth Cues," *SID 03 Digest*, (2003), pp. 1538-1541.

Takatsuka et al., "Retinal projection display using diffractive optical element," *Tenth International Conference on Intelligent Information Hiding and Multimedia Signal Processing*, IEEE, (2014), pp. 403-406.

Urey et al., "Optical performance requirements for MEMS-scanner based microdisplays," *Conf. on MOEMS and Miniaturized Systems*, SPIE, vol. 4178 (2000), pp. 176-185.

Urey, Hakan, "Diffractive exit-pupil expander for display applications," *Applied Optics*, vol. 40, No. 32 (2001), pp. 5840-5851.

Viirre et al., "The Virtual retina Display: A New Technology for Virtual Reality and Augmented Vision in Medicine," *Proc. of Medicine Meets Virtual Reality* (1998), pp. 252-257.

\* cited by examiner

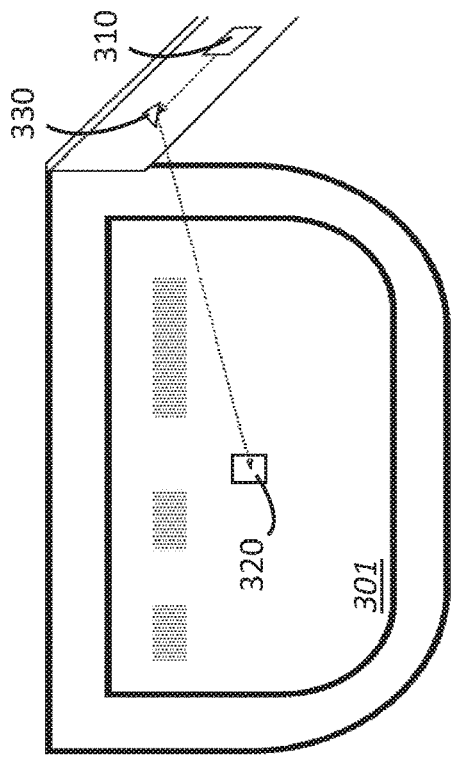
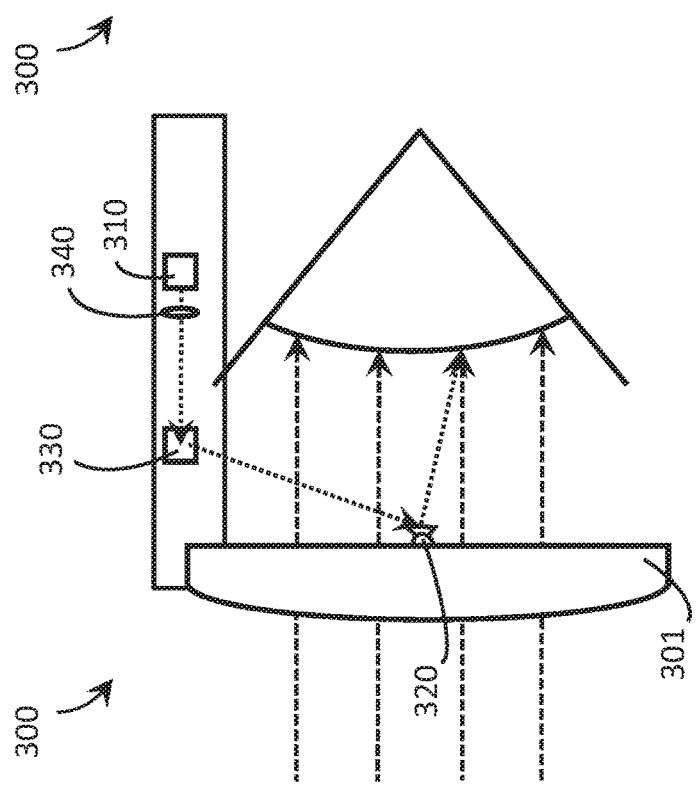
FIGURE 3B
FIGURE 3A

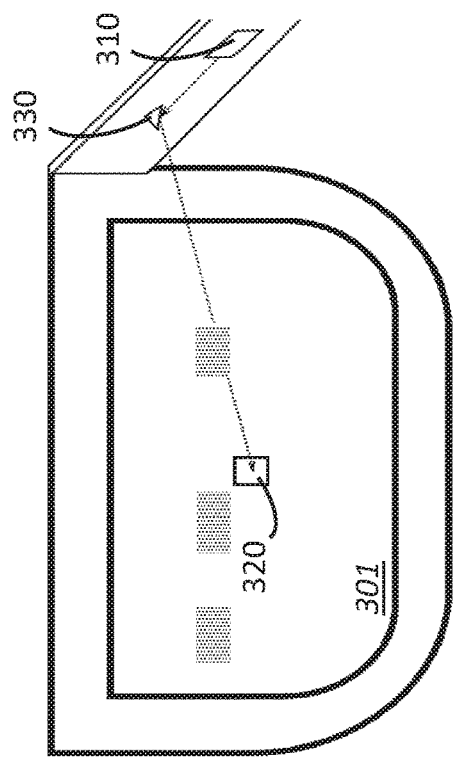
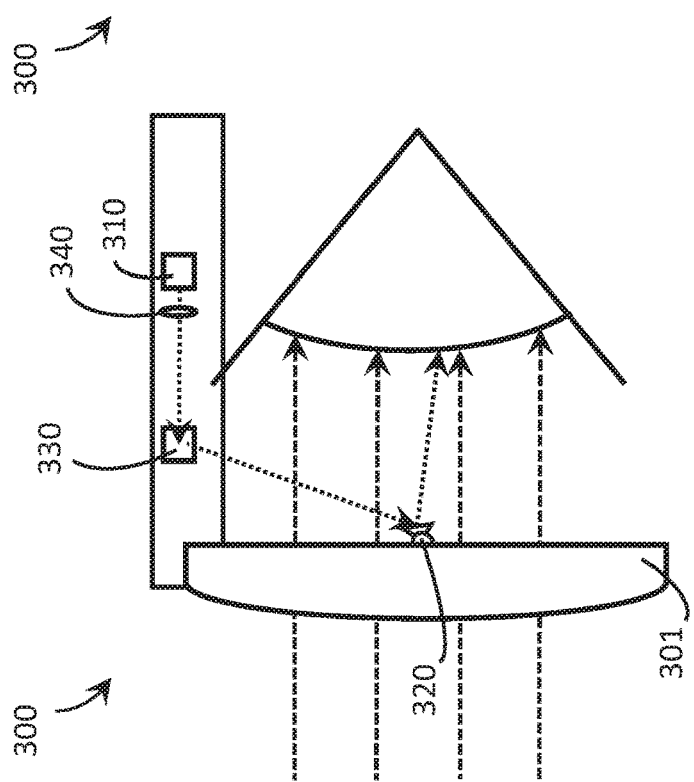
FIGURE 3D
FIGURE 3C

SYSTEMS, DEVICES, AND METHODS FOR WEARABLE HEADS-UP DISPLAYS

BACKGROUND

Technical Field

The present systems, devices, and methods generally relate to electronic display technologies and particularly relate to electronic display technologies that are well-suited for use in wearable heads-up displays.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems; however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Wearable Heads-Up Displays

While wearable electronic devices may be carried and, at least to some extent, operated by a user without encumbering the user's hands, many wearable electronic devices include at least one electronic display. Typically, in order for the user to access (i.e., see) and interact with content presented on such electronic displays, the user must modify their posture to position the electronic display in their field of view (e.g., in the case of a wristwatch, the user may twist their arm and raise their wrist towards their head) and direct their attention away from their external environment towards the electronic display (e.g., look down at the wrist bearing the wristwatch). Thus, even though the wearable nature of a wearable electronic device allows the user to carry and, to at least some extent, operate the device without occupying their hands, accessing and/or interacting with content presented on an electronic display of a wearable electronic device may occupy the user's visual attention and limit their ability to perform other tasks at the same time.

The limitation of wearable electronic devices having electronic displays described above may be overcome by wearable heads-up displays. A wearable heads-up display is a head-mounted display that enables the user to see displayed content but does not prevent the user from being able to see their external environment. A wearable heads-up display is an electronic device that is worn on a user's head and, when so worn, secures at least one electronic display within the accessible field of view of at least one of the user's eyes, regardless of the position or orientation of the user's head, but this at least one display is either transparent or at a periphery of the user's field of view so that the user is still able to see their external environment. Examples of wearable heads-up displays include: the Google Glass®, the Optinvent Ora®, the Epson Moverio®, the Sony Glasstron®, just to name a few.

A challenge in the design of most wearable heads-up display devices is the need to provide focused, high-quality images to the user without limiting the user's ability to see their external environment, and while at the same time minimizing the bulk of the wearable heads-up display unit itself. All of the wearable heads-up display devices available today are noticeably bulkier than a typical pair of corrective eyeglasses or sunglasses and there remains a need in the art for electronic display technology that enables wearable heads-up display devices of more aesthetically-appealing design while simultaneously providing high-quality images to the user without limiting the user's ability to see their external environment.

BRIEF SUMMARY

A wearable heads-up display may be summarized as including: a support structure that in use is worn on a head of a user; a transparent element that is physically coupled to the support structure, wherein the transparent element is positioned within a field of view of the user when the support structure is worn on the head of the user; a light source physically coupled to the support structure and positioned near or beyond a field of view of the user when the support structure is worn on the head of the user; a static reflector physically coupled to the support structure and positioned to receive light signals provided by the light source and redirect the light signals towards the transparent element; and a dynamic reflector positioned on or proximate the transparent element in the field of view of the user when the support structure is worn on the head of the user, wherein the dynamic reflector receives the light signals redirected by the static reflector, and wherein the dynamic reflector is controllably variable to reflect the light signals towards select regions of at least one eye of the user.

A method of operating a wearable heads-up display when the wearable heads-up display is worn on a head of a user, the wearable heads-up display including a transparent element positioned in a field of view of the user, a light source positioned substantially outside of the field of view of the user, a static reflector positioned substantially outside of the field of view of the user, and a dynamic reflector positioned on or proximate transparent element and within the field of view of the user, may be summarized as including: orienting the dynamic reflector in a first rotational orientation; generating a first light signal representative of at least a first portion of an image by the light source; redirecting the first light signal towards the dynamic reflector by the static reflector; and reflecting the first light signal towards an eye of the user by the dynamic reflector.

A wearable heads-up display may be summarized as including: a support structure that in use is worn on a head of a user; a transparent element that is physically coupled to the support structure, wherein the transparent element is positioned within a field of view of the user when the support structure is worn on the head of the user; a light source physically coupled to the support structure and positioned near or beyond a field of view of the user when the support structure is worn on the head of the user; a light-redirection element physically coupled to the support structure and positioned to receive light signals provided by the light source and redirect the light signals towards the transparent element; and a dynamic reflector positioned on or proximate the transparent element in the field of view of the user when the support structure is worn on the head of the user, wherein the dynamic reflector receives light signals redirected by the light-redirection element, and wherein the dynamic reflector is controllably variable to reflect the light signals towards select regions of at least one eye of the user. The light source may include at least one laser. The dynamic reflector may be controllably rotatable about at least two axes.

The wearable heads-up display may further include at least one collimator positioned in between the light source and the light-redirection element, wherein light signals provided by the light source pass through the at least one collimator before receipt by the light-redirection element.

The transparent element may include a prescription eyeglass lens. The transparent element may be positioned within a field of view of a first eye of the user when the support structure is worn on the head of the user, the wearable heads-up display may further include: a second transparent element that is physically coupled to the support structure, wherein the second transparent element is positioned within a field of view of a second eye of the user when the support structure is worn on the head of the user; a second light source physically coupled to the support structure and positioned near or beyond the field of view of the second eye of the user when the support structure is worn on the head of the user; a second light-redirection element physically coupled to the support structure and positioned to receive light signals provided by the second light source and redirect the light signals towards the second transparent element; and a second dynamic reflector positioned on or proximate the second transparent element in the field of view of the second eye of the user when the support structure is worn on the head of the user, wherein the second dynamic reflector receives light signals redirected by the second light-redirection element, and wherein the second dynamic reflector is controllably variable to reflect the light signals towards select regions of the second eye of the user. The support structure may have a general shape and appearance of an eyeglasses frame.

The wearable heads-up display may further include a processor physically coupled to the support structure and communicatively coupled to at least the light source and the dynamic reflector; and a non-transitory processor-readable storage medium physically coupled to the support structure and communicatively coupled to the processor, wherein the non-transitory processor-readable storage medium stores processor-executable instructions that, when executed by the processor, cause the processor to: control the light signals provided by the light source; and control the dynamic reflector to reflect the light signals provided by the light source towards select regions of at least one eye of the user.

The dynamic reflector may include a first dynamic reflector, the wearable heads-up display may further include: a second dynamic reflector positioned on or proximate the transparent element in the field of view of the user when the support structure is worn on the head of the user, the second dynamic reflector physically spaced apart from the first dynamic reflector, wherein the second dynamic reflector receives light signals redirected by the light-redirection element, and wherein the second dynamic reflector is controllably variable to reflect the light signals towards select regions of at least one eye of the user. The wearable heads-up display may further include: at least one additional dynamic reflector positioned on or proximate the transparent element in the field of view of the user when the support structure is worn on the head of the user, the at least one additional dynamic reflector physically spaced apart from both the first dynamic reflector and the second dynamic reflector, wherein the at least one additional dynamic reflector receives light signals redirected by the light-redirection element, and wherein the at least one additional dynamic reflector is controllably variable to reflect the light signals towards select regions of at least one eye of the user. The light-redirection element may be controllably switchable into and between a first configuration in which light signals provided by the light source and received by the light-redirection element are redirected towards the first dynamic reflector and a second configuration in which light signals provided by the light source and received by the light-redirection element are redirected towards the second dynamic reflector. The wearable heads-up display may further include an eye-tracker carried by the support structure, wherein the light-redirection element is controllably switchable into and between the first configuration and the second configuration based, at least in part, on a position of the at least one eye of the user as determined by the eye-tracker.

The dynamic reflector may include a digital microelectromechanical system (MEMS) micromirror.

A method of operating a wearable heads-up display when the wearable heads-up display is worn on a head of a user, the wearable heads-up display including a transparent element positioned in a field of view of the user, a light source positioned substantially outside of the field of view of the user, a light-redirection element positioned substantially outside of the field of view of the user, and a dynamic reflector positioned on or proximate the transparent element and within the field of view of the user, may be summarized as including: orienting the dynamic reflector in a first orientation within the field of view of the user; generating a first light signal representative of at least a first portion of an image by the light source outside of the field of view of the user; redirecting the first light signal towards the dynamic reflector by the light-redirection element outside of the field of view of the user; and reflecting the first light signal towards an eye of the user by the dynamic reflector within the field of view of the user.

The method may further include: orienting the dynamic reflector in a second orientation within the field of view of the user; generating a second light signal representative of at least a second portion of the image by the light source outside of the field of view of the user; redirecting the second light signal towards the dynamic reflector by the light-redirection element outside of the field of view of the user; and reflecting the second light signal towards the eye of the user by the dynamic reflector within the field of view of the user. The image may include N portions, where N is an integer greater than 2, and the method may further include: until i=(N+1), where i is an integer with an initial value of 3, sequentially: orienting the dynamic reflector in an $i^{th}$ orientation within the field of view of the user; generating an $i^{th}$ light signal representative of at least an $i^{th}$ portion of the image by the light source outside of the field of view of the user; redirecting the $i^{th}$ light signal towards the dynamic reflector by the light-redirection element outside of the field of view of the user; reflecting the $i^{th}$ light signal towards the eye of the user by the dynamic reflector within the field of view of the user; and incrementing i by 1.

The wearable heads-up display may include a processor communicatively coupled to the light source and to the dynamic reflector, and a non-transitory processor-readable storage medium communicatively coupled to the processor, the non-transitory processor-readable storage medium storing processor-executable instructions. In this case, the method may further include executing the processor-executable instructions by the processor to: cause the processor to instruct the light source to generate the first light signal representative of at least a first portion of the image; and cause the processor to instruct the dynamic reflector to adopt the first orientation.

The dynamic reflector may include a first dynamic reflector and the wearable heads-up display may further include a second dynamic reflector positioned on or proximate the transparent element and within the field of view of the user, the second dynamic reflector physically spaced apart from the first dynamic reflector. In this case, the method may further include: configuring the light-redirection element in a first configuration, wherein: orienting the dynamic reflector in a first orientation within the field of view of the user includes orienting the first dynamic reflector in the first orientation within the field of view of the user; redirecting the first light signal towards the dynamic reflector by the light-redirection element outside of the field of view of the user includes redirecting the first light signal towards the first dynamic reflector by the light-redirection element outside of the field of view of the user while the light-redirection element is in the first configuration; and reflecting the first light signal towards an eye of the user by the dynamic reflector within the field of view of the user includes reflecting the first light signal towards the eye of the user by the first dynamic reflector within the field of view of the user; configuring the light-redirection element in a second configuration; orienting the second dynamic reflector in a first orientation within the field of view of the user; generating a second light signal representative of at least a portion of an image by the light source outside of the field of view of the user; redirecting the second light signal towards the second dynamic reflector by the light-redirection element outside of the field of view of the user while the light-redirection element is in the second configuration; and reflecting the second light signal towards the eye of the user by the second dynamic reflector within the field of view of the user.

The wearable heads-up display may include an eye-tracker, and the method may further include: determining a position of the eye of the user by the eye-tracker; and configuring the light-redirection element in either the first configuration in which light signals received from the light source by the light-redirection element are redirected towards the first dynamic reflector or the second configuration in which light signals received from the light source by the light-redirection element are redirected towards the second dynamic reflector based, at least in part, on the position of the eye of the user determined by the eye-tracker.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 3A is an illustrative diagram showing a side view of a wearable heads-up display in a first stage of an exemplary use in accordance with the present systems, devices, and methods.

FIG. 3B is an illustrative diagram showing a front view of a wearable heads-up display in the first stage of the exemplary use in accordance with the present systems, devices, and methods.

FIG. 3C is an illustrative diagram showing a side view of a wearable heads-up display in a second stage of the exemplary use in accordance with the present systems, devices, and methods.

FIG. 3D is an illustrative diagram showing a front view of a wearable heads-up display in the second stage of the exemplary use in accordance with the present systems, devices, and methods.

DETAILED DESCRIPTION

Figure 1:
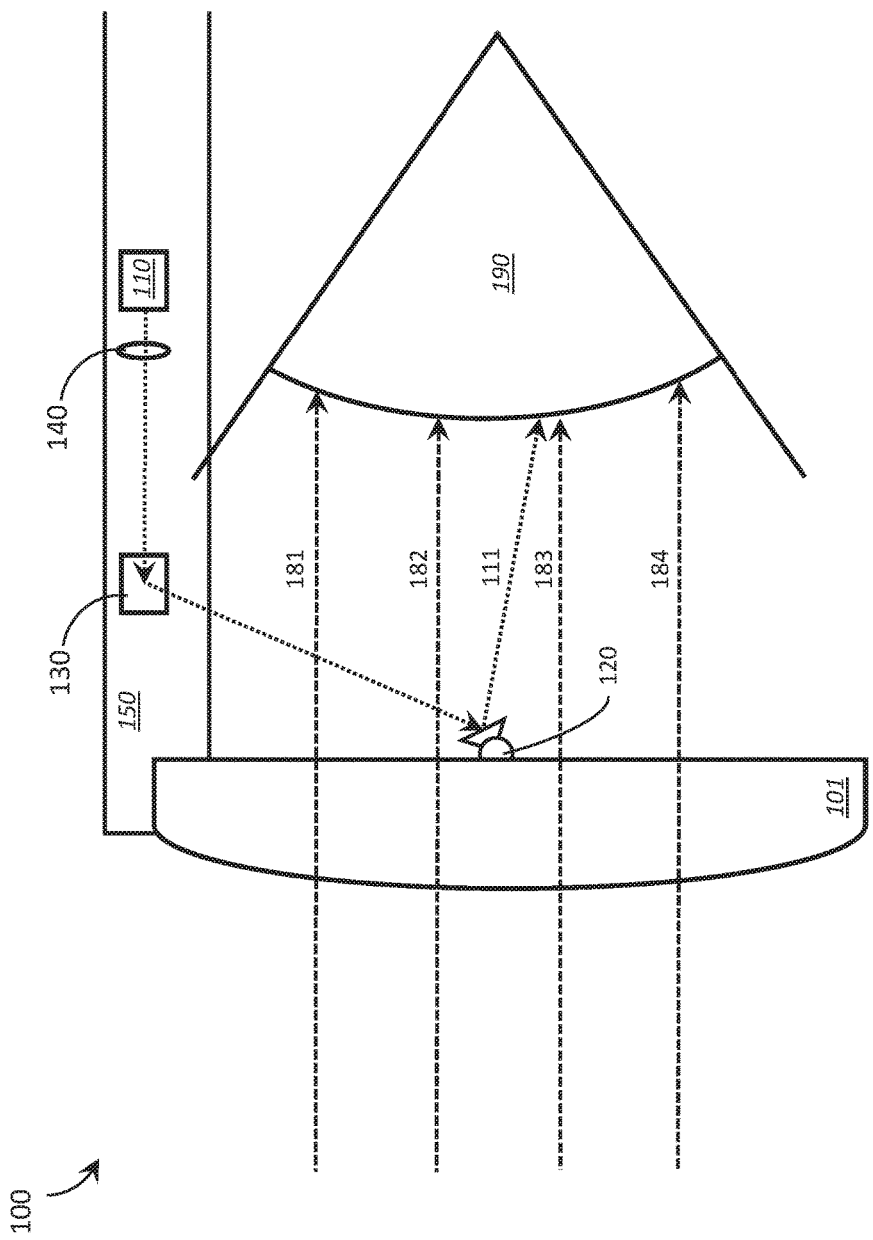
FIG. 1 is an illustrative diagram showing a side view of a wearable heads-up display in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for wearable heads-up displays that are at least partially transparent. The wearable heads-up displays described herein are significantly less bulky and less massive than other wearable heads-up displays available today.

Various wearable heads-up displays described herein each employ at least three components: at least one light-emitting element (e.g., a "light source," "laser source," "laser", "light emitting diode(s)") that produces (e.g., generates and/or emits) an image in portions at a time (e.g., on a pixel-by-pixel basis, a row-by-row basis, or a column-by-column basis), at least one controllably variable reflector (e.g., a "dynamic reflector"); and at least one light-redirection element (e.g., a "reflector," a "refractor," a "diffractor," "mirror," "half silvered mirror," "dichroic filter," "prism," "optic") or an element that uses any or all of reflection, refraction, and diffraction in combination). Together, these three components scan light emitted by the light source over the user's eye to produce an image seen by the user. In the present systems, devices, and methods, the at least one light-redirection element is placed outside of the user's field of view and the at least one dynamic reflector is placed directly in the user's field of view, either on or at least proximate a transparent element of the wearable heads-up display such that the user may simultaneously see light from the external environment and light reflected from the at least one dynamic reflector of the wearable heads-up display.

Throughout this specification and the appended claims, reference is often made to a "transparent element" of a wearable heads-up display. As described in more detail later on, the wearable heads-up displays of the present systems, devices, and methods may be sized and dimensioned similar to (or otherwise have the general shape and appearance of) a pair of eyeglasses or sunglasses. In some embodiments, elements of the wearable heads-up display devices described herein may even be added to an existing pair of eyeglasses or sunglasses in order to convert the existing pair of eyeglasses or sunglasses into a wearable heads-up display as described herein. Accordingly, a "transparent element" of the wearable heads-up displays described herein may resemble or literally be a lens from a pair of eyeglasses or sunglasses, including but not limited to a prescription lens. Throughout the remainder of this description, the term "lens" is generally used to refer to such a "transparent element," though a person of skill in the art will appreciate that the transparent element(s) of the present systems, devices, and methods may take other "non-lens" forms in some implementations. For example, in some implementations a transparent element may be better characterized as a window having no substantial optical power or "lensing" effect on light transmitted therethrough. Furthermore, the term "transparent" should be interpreted generally as "substantially transparent" and does not limit the present systems, devices, and methods to lenses and transparent elements having 100% transparency.

Throughout this specification and the appended claims, the term "dynamic" is often used to describe one or more reflector(s)/refractor(s). Unless the specific context requires otherwise, the term "dynamic reflector" is used to describe a reflector that is controllably variable (either rigidly of flexibly, e.g., by deformation) in at least one of its shape, its position, its rotation, and/or its orientation with respect to light signals that are incident thereon. A digital micromirror, such as a MEMS-based micromirror, is an example of a dynamic reflector that may be used in accordance with the present systems, devices, and methods.

A person of skill in the art will appreciate that, in general, one or more reflective element(s) may be replaced by one or more refractive element(s) and/or one or more diffractive element(s), and vice versa, with some re-alignment of the optical path sometimes necessary, to achieve the same final end trajectory of a light signal. Unless the specific context requires otherwise, the terms "reflector" and "refractor" should generally be construed as non-limiting examples that may be interchanged without undue burden or experimentation. To support this interchangeability, the term "light-redirection element" is used in this specification and the appended claims to encompass reflectors, refractors, diffractors, and combinations thereof.

FIG. 1 is an illustrative diagram showing a side view of a wearable heads-up display 100 in accordance with the present systems, devices, and methods. Display 100 includes a lens (e.g., a "transparent element," partially transparent element," "focusing lens") 101 physically coupled to a support structure 150. In use, support structure 150 is worn on a head of a user so that lens 101 is positioned in front of and within a field of view of at least one eye 190 of the user. The combination of support structure 150 and lens 101 may resemble, or may literally be, a pair of eyeglasses or sunglasses. Support structure 150 carries (e.g., on a frame portion thereof at a perimeter of lens 101 or on an arm portion thereof that extends towards and over an ear of the user) a first light source 110. In the illustration of FIG. 1, an arm of support structure 150 is depicted and support structure 150 carries (e.g., on the arm portion thereof that extends towards and over an ear of the user, but in alternative embodiments on a portion of the support structure 150 that frames lens 101) a first light source 110, a collimator 140, and a light-redirection element 130. In use, light source 110 generates and emits one or more light signal(s) 111 that represent an image (or respective portion(s) thereof). Light signal 111 is projected from light source 110 towards, and received by, light-redirection element 130. In the illustrated implementation, light-redirection element 130 is a mirror positioned at a fixed angle to redirect (e.g., reflects, refracts, diffracts, or some combination thereof) light signals 111 from light source 110 towards a dynamic reflector 120 that is affixed to or at least positioned proximate lens 101, directly in front of the eye 190 of the user and in the user's field of view. Light source 110 may (e.g., with appropriately timed modulation) sequentially generate and emit portions or aspects (e.g., pixels, rows, columns, etc.) of an image and these portions or aspects may be scanned over the eye 190 of the user by dynamic reflector 120 to produce the collective image.

Wearable heads-up display 100 operates in accordance with the principle that the human eye can position a light source in the field of view based on the angle at which light from the source enters the eye as opposed to strictly based on the position of the light source in the eye's field of view. Depending on the specific implementation, light source 110 may be a point source (such as a single LED or a laser module) or a register of point sources (such as a row of LEDs), or a multi-laser module such as an RGB laser module. Dynamic reflector 120 may be variable in terms of shape (e.g., deformable) and/or variable in terms of position, rotation, or orientation. For example, dynamic reflector 120 may be rotatable in one rotational dimension or in at least two rotational directions (e.g., two orthogonal rotational directions). Light from the user's external environment is depicted by rays 181, 182, 183, and 184, which pass through lens 101 and into the user's eye 190 substantially unaffected; though a person of skill in the art will appreciate that a small (virtually negligible) portion of external light may be blocked by dynamic reflector 120.

Figure 2:
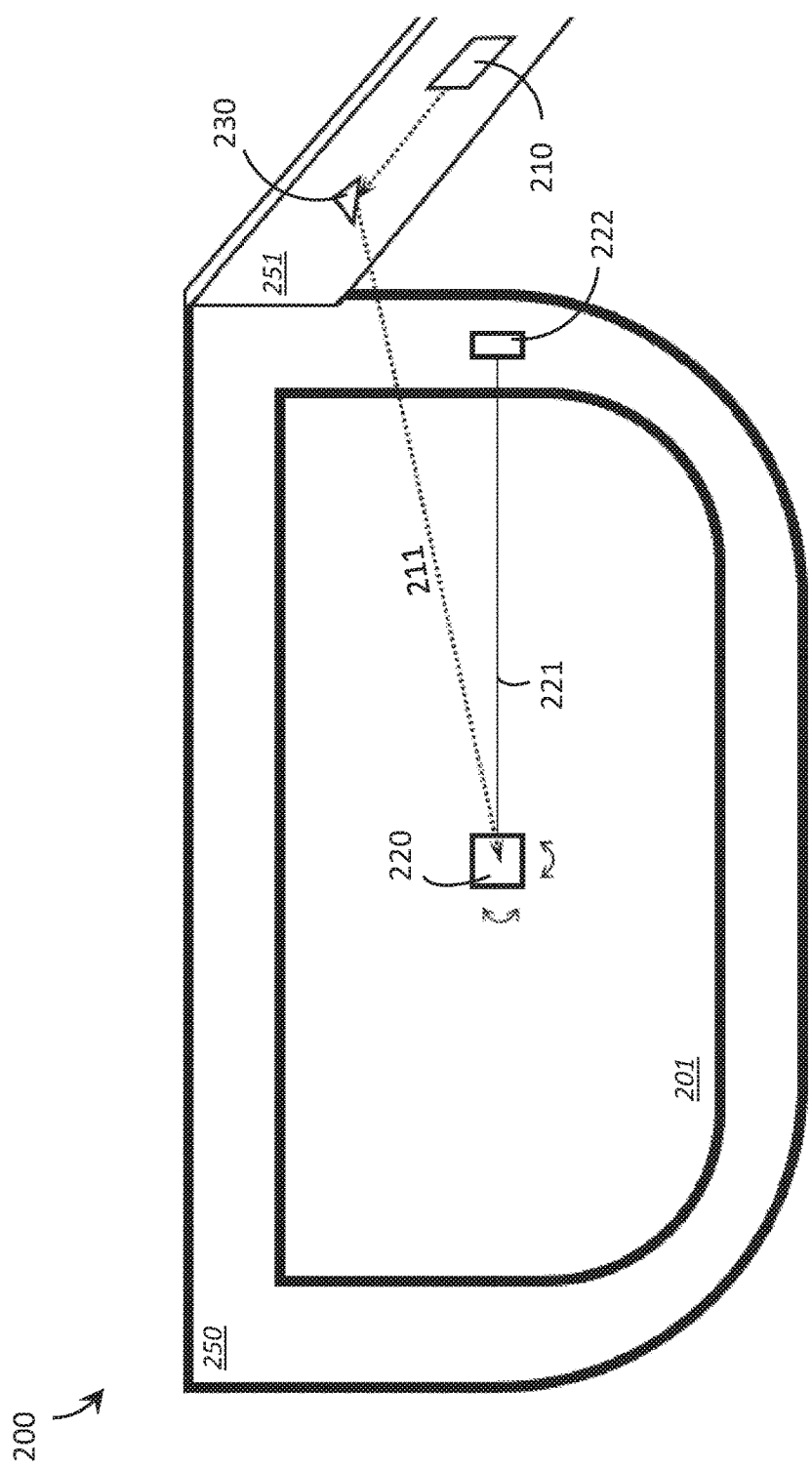
FIG. 2 is an illustrative diagram showing a front view of a wearable heads-up display in accordance with the present systems, devices, and methods.

FIG. 2 is an illustrative diagram showing a front view (from the user's perspective) of a wearable heads-up display 200 in accordance with the present systems, devices, and methods. Display 200 is substantially similar to display 100 from FIG. 1. Display 200 includes a lens 201 carried by a support structure 250. Support structure 250 includes a support arm 251 that carries a light source 210 (with collimator, not separately shown) and a light-redirection element 230, both substantially outside of the user's field of view when wearable heads-up display 200 is worn on a head of the user. Light-redirection element may include one or more reflective element(s), refractive element(s), and/or diffractive element(s). Display 100 also includes a single dynamic reflector 220 positioned on or proximate lens 201 in the user's field of view. Dynamic reflector 220 may be a micromirror device (e.g., a microelectromechanical system ("MEMS") based device or other digital micromirror device) and may be sufficiently small to allow a majority of external light to pass through lens 201 unblocked. In the illustrated implementation, dynamic reflector 220 is controllably rotatable about two orthogonal axes and therefore operable to redirect/scan light from light source 210 (after reflection by light-redirection element 230) across the entire area of the user's eye. Dynamic reflector 220 is electrically communicatively coupled (by at least one thin or substantially transparent electrically conductive pathway 221, e.g., adhered with glue or deposited as a thin film on a surface of lens 201) to and controlled by a controller 222 (e.g., variable current or power source) carried by support structure 250.

FIGS. 3A through 3K provide an illustrative example of how the wearable heads-up displays described herein can be used to display an image in the same field of view as light from external sources. FIGS. 3A through 3K implement transparent displays that are substantially similar to displays 100 and 200 from FIGS. 1 and 2, respectively.

FIGS. 3A and 3B are illustrative diagrams showing a side view and a front view, respectively, of a wearable heads-up display 300 in a first stage of an exemplary use in accordance with the present systems, devices, and methods. In the first stage of the exemplary use, a light source 310, outside of the field of view of the user, is modulated to sequentially generate and emit a first set of light signals that together represent a first (i.e., topmost) row (e.g., row of pixels) of an image. The first set of light signals are transmitted through collimator 340 and received, outside of the field of view of the user, by light-redirection element 330. Light-redirection element 330 redirects (e.g., reflects, refracts, diffracts, or some combination thereof) the first set of light signals towards dynamic reflector 320. Since the first set of light signals correspond to the topmost row (e.g., row of pixels) of the image, dynamic reflector 320 is positioned in a first rotational orientation in a first axis (e.g., a vertical or y-axis) and scans/rotates across a second axis (e.g., a horizontal or x-axis) to reflect the light signals over a first region of the user's eye in the horizontal direction at a first angle in the vertical direction. Light from external sources passes through lens 301 to allow the user to see through the display 300 while light from light source 310 is directed into the user's field of view from dynamic reflector 320.

FIGS. 3C and 3D are illustrative diagrams showing a side view and a front view, respectively, of display 300 in a second stage of the exemplary use in accordance with the present systems, devices, and methods. In the second stage of the exemplary use, light source 310 generates and emits a second set of light signals that together represent a second row (e.g., row of pixels) of an image. The second set of light signals are transmitted through collimators 340 and received by light-redirection element 330. Light-redirection element 330 redirects (e.g., reflects, refracts, diffracts, or some combination thereof) the second set of light signals towards dynamic reflector 320. Since the second set of light signals correspond to the second row (e.g., row of pixels) of the image, dynamic reflector 320 is positioned in a second rotational orientation in the first axis (e.g., the vertical or y-axis) and scans/rotates across the second axis (e.g., the horizontal or x-axis) to reflect the light signals over a second region of the user's eye in the horizontal direction at a second angle in the vertical direction. Light from external sources passes through lens 301 to allow the user to see through the display 300 while light from light source 310 is directed into the user's field of view from dynamic reflector 320.

Figure 3F:
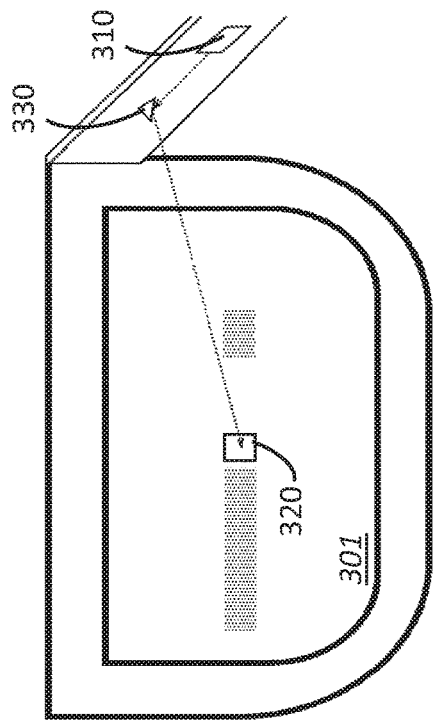
FIG. 3F is an illustrative diagram showing a front view of a wearable heads-up display in the third stage of the exemplary use in accordance with the present systems, devices, and methods.
Figure 3E:
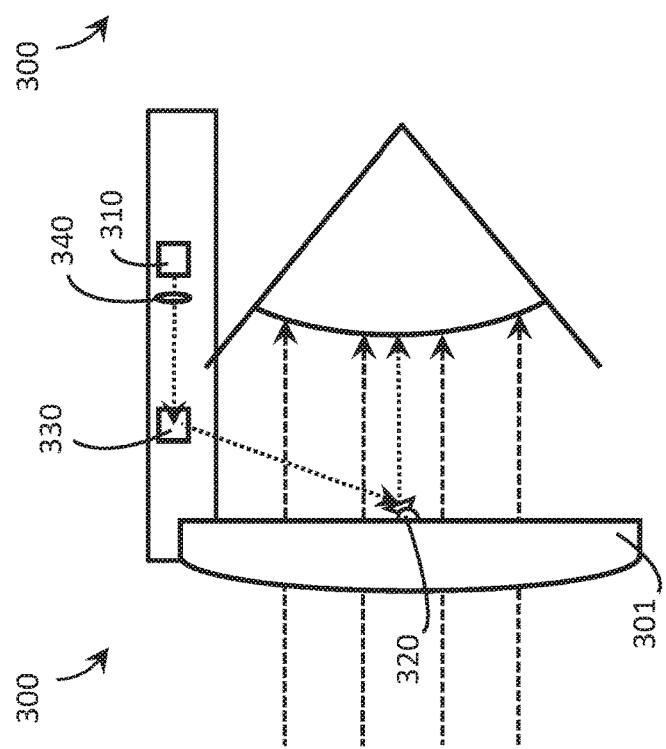
FIG. 3E is an illustrative diagram showing a side view of a wearable heads-up display in a third stage of the exemplary use in accordance with the present systems, devices, and methods.

FIGS. 3E and 3F are illustrative diagrams showing a side view and a front view, respectively, of display 300 in a third stage of the exemplary use in accordance with the present systems, devices, and methods. In the third stage of the exemplary use, light source 310 generates and emits a third set of light signals that together represent a third row (e.g., row of pixels) of an image. The third set of light signals are transmitted through collimators 340 and received by light-redirection element 330. Light-redirection element 330 redirects (e.g., reflects, refracts, diffracts, or some combination thereof) the third set of light signals towards dynamic reflector 320. Since the third set of light signals correspond to the third row (e.g., row of pixels) of the image, dynamic reflector 320 is positioned in a third rotational orientation in the first axis (e.g., the vertical or y-axis) and scans/rotates across the second axis (e.g., the horizontal or x-axis) to reflect the light signals over a third region of the user's eye in the horizontal direction at a third angle in the vertical direction. Light from external sources passes through lens 301 to allow the user to see through the display 300 while light from light source 310 is directed into the user's field of view from dynamic reflector 320.

Figure 3H:
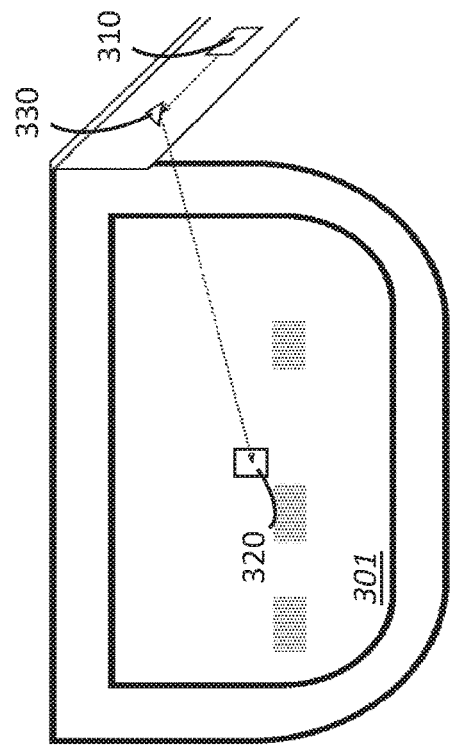
FIG. 3H is an illustrative diagram showing a front view of a wearable heads-up display in the fourth stage of the exemplary use in accordance with the present systems, devices, and methods.
Figure 3G:
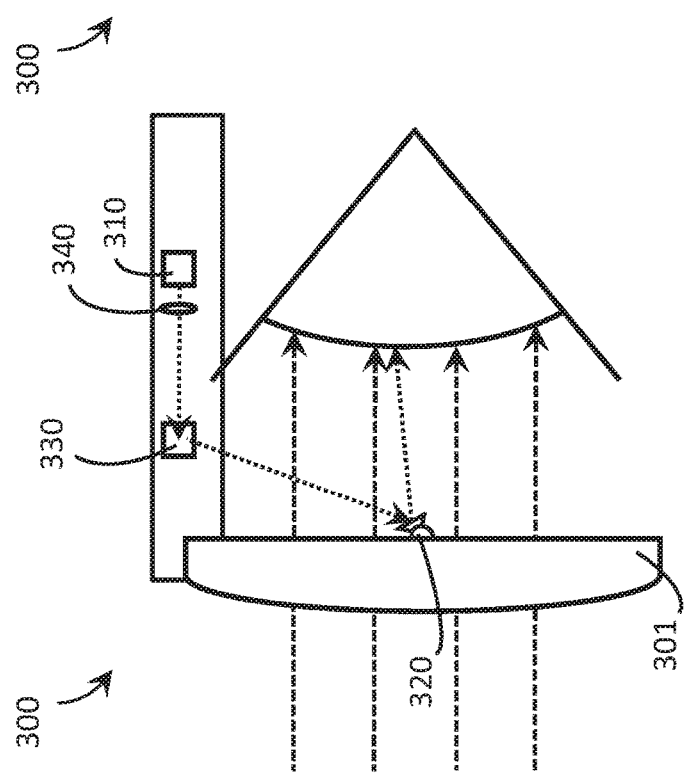
FIG. 3G is an illustrative diagram showing a side view of a wearable heads-up display in a fourth stage of the exemplary use in accordance with the present systems, devices, and methods.

FIGS. 3G and 3H are illustrative diagrams showing a side view and a front view, respectively, of display 300 in a fourth stage of the exemplary use in accordance with the present systems, devices, and methods. In the fourth stage of the exemplary use, light source 310 generates and emits a fourth set of light signals that together represent a fourth row (e.g., row of pixels) of an image. The fourth set of light signals are transmitted through collimators 340 and received by light-redirection element 330. Light-redirection element 330 redirects (e.g., reflects, refracts, diffracts, or some combination thereof) the fourth set of light signals towards dynamic reflector 320. Since the fourth set of light signals correspond to the fourth row (e.g., row of pixels) of the image, dynamic reflector 320 is positioned in a fourth rotational orientation in the first axis (e.g., the vertical or y-axis) and scans/rotates across the second axis (e.g., the horizontal or x-axis) to reflect the light signals over a fourth region of the user's eye in the horizontal direction at a fourth angle in the vertical direction. Light from external sources passes through lens 301 to allow the user to see through the display 300 while light from light source 310 is directed into the user's field of view from dynamic reflector 320.

Figure 3J:
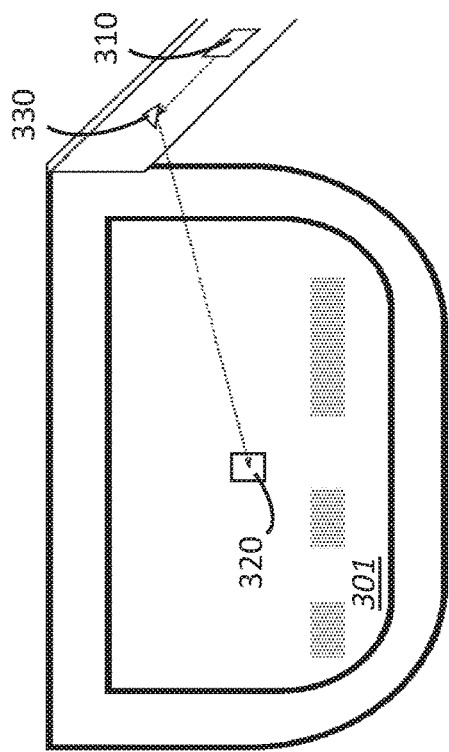
FIG. 3J is an illustrative diagram showing a front view of a wearable heads-up display in the fifth stage of the exemplary use in accordance with the present systems, devices, and methods.
Figure 3I:
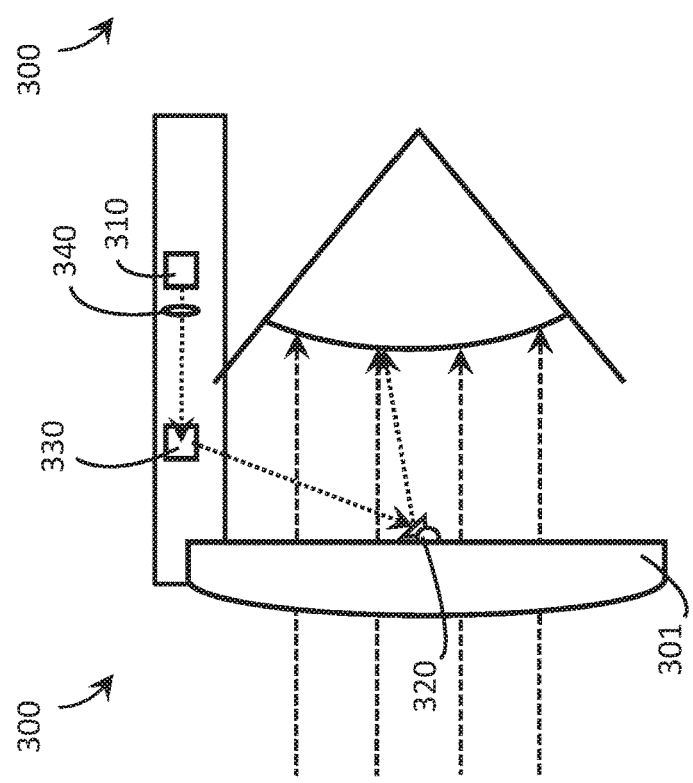
FIG. 3I is an illustrative diagram showing a side view of a wearable heads-up display in a fifth stage of the exemplary use in accordance with the present systems, devices, and methods.

FIGS. 3I and 3J are illustrative diagrams showing a side view and a front view, respectively, of display 300 in a fifth stage of the exemplary use in accordance with the present systems, devices, and methods. In the fifth stage of the exemplary use, light source 310 generates and emits a fifth set of light signals that together represent a fifth row (e.g., row of pixels) of an image. The fifth set of light signals are transmitted through collimators 340 and received by light-redirection element 330. Light-redirection element 330 redirects (e.g., reflects, refracts, diffracts, or some combination thereof) the fifth set of light signals towards dynamic reflector 320. Since the fifth set of light signals correspond to the fifth row (e.g., row of pixels) of the image, dynamic reflector 320 is positioned in a fifth rotational orientation in the first axis (e.g., the vertical or y-axis) and scans/rotates across the second axis (e.g., the horizontal or x-axis) to reflect the light signals over a fifth region of the user's eye in the horizontal direction at a fifth angle in the vertical direction. Light from external sources passes through lens 301 to allow the user to see through the display 300 while light from light source 310 is directed into the user's field of view from dynamic reflector 320.

Figure 3K:
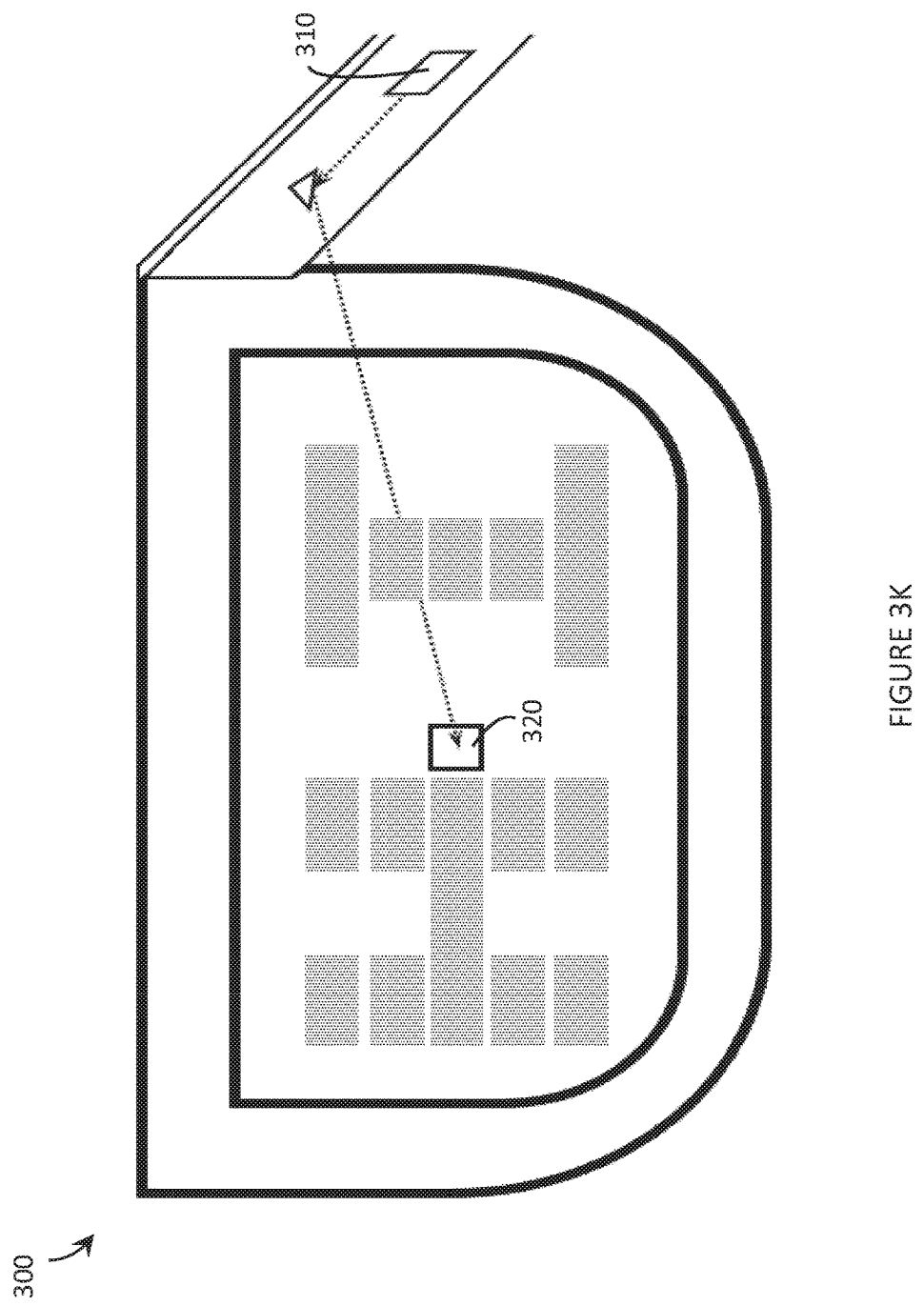
FIG. 3K is an illustrative diagram showing a front view of a wearable heads-up display and summarizing the cumulative effect of the exemplary use in accordance with the present systems, devices, and methods.

FIG. 3K is an illustrative diagram showing a front view (from the user's point of view) of display 300 and summarizing the cumulative effect of the exemplary use in accordance with the present systems, devices, and methods. In accordance with the present systems, devices, and apparatus, the light signals from light source 310 and the rotational orientation of dynamic reflector 320 may be substantially simultaneously switched, varied, cycled, modulated, or otherwise changed with sufficient rapidity (e.g., at a frequency on the order of hundreds of Hz, kHz, or even MHz) such that the user's eye does not detect the latency between receiving the light signals corresponding to the first row (e.g., row of pixels), as per FIGS. 3A and 3B, and receiving the light signals corresponding to the last row (e.g., last row of pixels), as per FIGS. 3I and 3J. The user sees a single cumulative image that projects upon, overlays, or otherwise shares the field of view with imagery from external sources and, in some implementations, may be tuned to exhibit varying degrees of transparency or opacity (e.g., by changing the frequency at which the elements are switched). FIG. 3K demonstrates that the cumulative effect of the successive portions of an image referenced in the exemplary use depicted in FIGS. 3A through 3J is an image of the word "HI" presented on display 300.

The wearable heads-up displays described herein may be used to display static or dynamic content (at virtually any resolution), including without limitation: text, images, notifications, maps, videos, menus, gauges, and/or dynamic user interfaces. As an example, 1080 p video having a frame rate of 24 fps with a 16:9 aspect ratio may be presented by a display taught herein by synchronously modulating the light source (110, 210, 310) and the dynamic reflector (120, 220, 320) to project 1080 rows and 1920 columns at a switching rate of about 26 kHz (e.g., 1080 rows multiplied by 24 frames). Such is entirely feasible using, for example one or more laser diode(s) for the light source (110, 210, 310) and a microelectromechanical system (MEMS) based micromirror (e.g., digital micromirror) for the dynamic reflector (120, 220, 320).

While displays 100, 200, and 300 each implement a single dynamic reflector (120, 220, and 320, respectively) positioned in the user's field of view and a static (i.e., not controllably variable, but rather fixed in a single shape, position, rotation, and/or orientation) light-redirection element (130, 230, and 330, respectively) positioned on an arm of the support structure, alternative implementations may include multiple dynamic reflectors (120, 220, 320) positioned at multiple positions in the user's field of view on the lens (101, 201, 301, respectively), with each dynamic reflector communicatively coupled to a common or respective controller (e.g., 222) through a respective thin or substantially transparent electrically conductive pathway (e.g., 221). In such implementations, the light-redirection element (130, 230, 330) may be controllably switchable between a number of configurations, each configuration oriented to redirect light from the light source (110, 210, 310) to a respective one of the multiple dynamic reflectors (120, 220, 320). The use of multiple dynamic reflectors (120, 220, 320) can increase the field of view of the display (100, 200, 300) by using each dynamic reflector (120, 220, 320) to project a respective portion of a larger complete image, and/or the use of multiple dynamic reflectors (120, 220, 320) can increase the effective "eyebox" of the optical system by using each dynamic reflector (120, 220, 320) to project a respective copy of the same image. Increasing the effective eyebox enables the user to see the projected image from a wider range of eye positions; however, since dynamic reflectors (120, 220, 320) positioned in the user's field of view may block the transmission of light from external sources, it can be advantageous to use a small number of dynamic reflectors (120, 220, 320), such as 1, 2, 5 or fewer, between 5 and 10, or fewer than 20. In some implementations, a square grid of dynamic reflectors (120, 220, 320) may be used, such as 4 dynamic reflectors, 9 dynamic reflectors, 16 dynamic reflectors, and so on.

Figure 4:
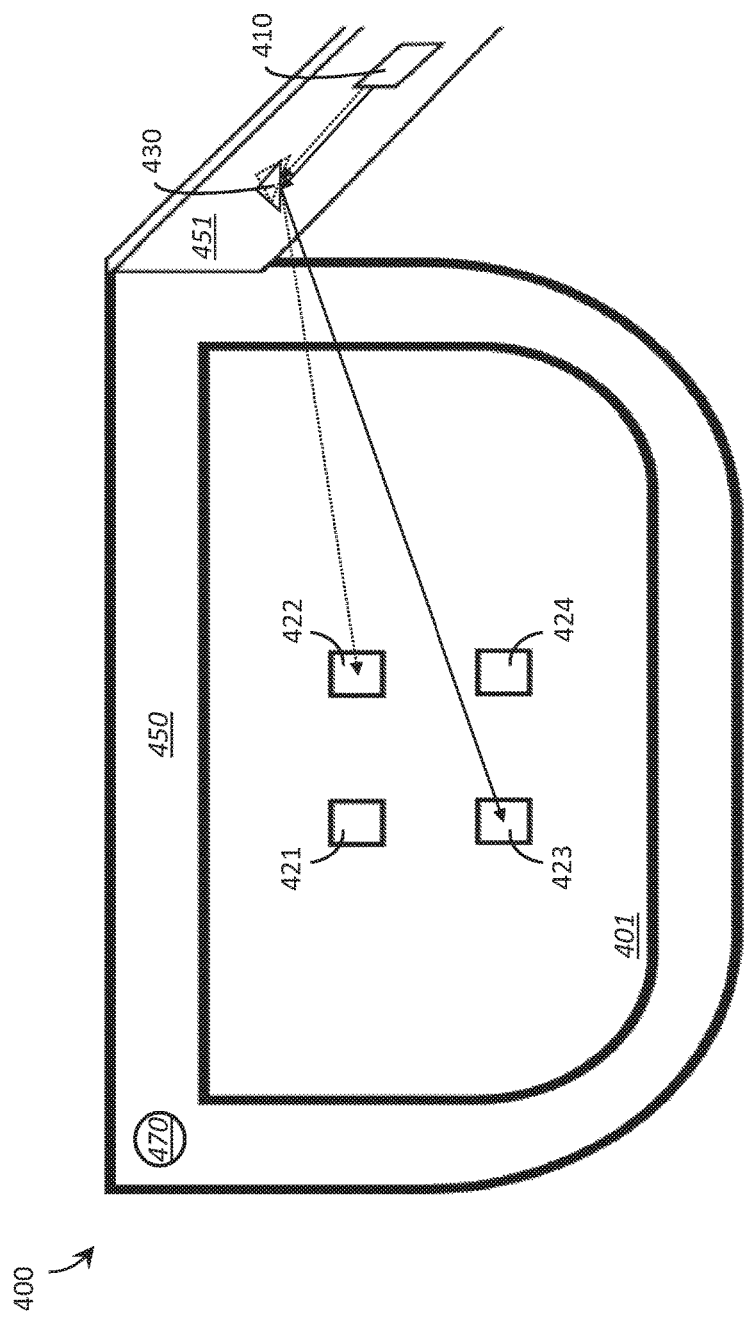
FIG. 4 is an illustrative diagram showing a front view (from the user's point of view) of a wearable heads-up display employing multiple lens-mounted dynamic reflectors in accordance with the present systems, devices, and methods.

FIG. 4 is an illustrative diagram showing a front view (from the user's point of view) of a wearable heads-up display 400 employing multiple lens-mounted dynamic reflectors 421, 422, 423, and 424 in accordance with the present systems, devices, and methods. Display 400 is substantially similar to displays 100, 200, and 300 in that it includes a transparent element (or lens) 401 carried by a support structure 450 and positioned in the field of view of an eye of a user when the support structure 450 is worn on the head of the user. Like displays 100, 200, and 300, support structure 450 includes an arm 451 that extends towards the user's ear, and arm 451 carries a light source 410 (e.g., one or more laser diode(s)) and a light-redirection element 43; however, display 400 differs from displays 100, 200, and 300 in at least the following ways: i) display 400 includes multiple (e.g., four in the illustrated embodiment) dynamic reflectors 421, 422, 424, and 424 all positioned on or proximate lens 401 in the field of view of the eye of the user the four dynamic reflectors 421, 422, 423, and 424 all being physically spaced apart from one another; and ii) light-redirection element 430 is controllably switchable into and between multiple configurations, where each configuration causes light-redirection element 430 to redirect light signals from light source 410 to a respective one of dynamic reflectors 421, 422, 423, and 424. In the illustrated example, a first configuration of light-redirection element 430 is drawn in solid lines and a first light signal (also drawn in solid lines) is shown emitted from light source 410 and redirected by light-redirection element 430 (in its first configuration) to a first dynamic reflector 423. The illustrated embodiment also depicts a second configuration of light-redirection element 430 drawn in dashed lines and a second light signal (also drawn in dashed lines) is shown emitted from light source 410 and redirected by light-redirection element 430 (in its second configuration) to a second dynamic reflector 422.

The various embodiments described herein may also include systems and methods for eye tracking. As an example, display 400 includes an eye-tracker 470 (only a single component drawn, though a person of skill in the art will appreciate that an eye-tracker may include multiple components, such as for example an infrared light source and an infrared light detector). In use, eye-tracker 470 determines the position of the user's eye and/or the user's gaze direction relative to lens 401 and, in particular, relative to dynamic reflectors 421, 422, 423, and 424. With this information, display 400 may selectively control (e.g., by accordingly switching light-redirection element 430 into and between corresponding configurations) which of dynamic reflectors 421, 422, 423, and/or 424 is/are used to reflect light signals into the user's eye. For example, if one or more of dynamic reflectors 421, 422, 423, and/or 424 is/are not capable of reflecting light signals received from light-redirection element 430 into the region of the user's pupil given the user's pupil position as determined by eye-tracker 470, then that one or more dynamic reflector 421, 422, 423, and/424 may be deactivated (as well as its corresponding configuration of light-redirection element 430) until the user moves their pupil to a new position. In other words, light-redirection element 430 is controllably switchable into and between multiple configurations (including the first configuration and the second configuration) based, at least in part, on a position of the at least one eye of the user as determined by eye-tracker 470.

The transparent displays described herein may be used in applications outside of the space of wearable heads-up displays (e.g., as televisions, monitors, and the like) or in more specialized applications such as window display screens. In applications where a transparent display is typically viewed from a distance (e.g., on the order of meters) the collimators described may not be necessary. However, with the use of collimators, the transparent displays described herein are particularly well-suited for use in wearable heads-up display devices. In such devices, a single transparent display may be positioned in the field of view of one eye of the user while no transparent display is positioned in the field of view of the other eye of the user, or a single transparent display may be positioned in (and span) the fields of views of both eyes of the user, or a first transparent display (e.g., 100, 200, 300) may be positioned in the field of view of a first eye of the user and a second transparent display (e.g., 100, 200, 300) may be positioned in the field of view of a second eye of the user. In the latter case, the second transparent display may essentially duplicate the first transparent display, with or without stereoscopic adjustment as desired.

Figure 5:
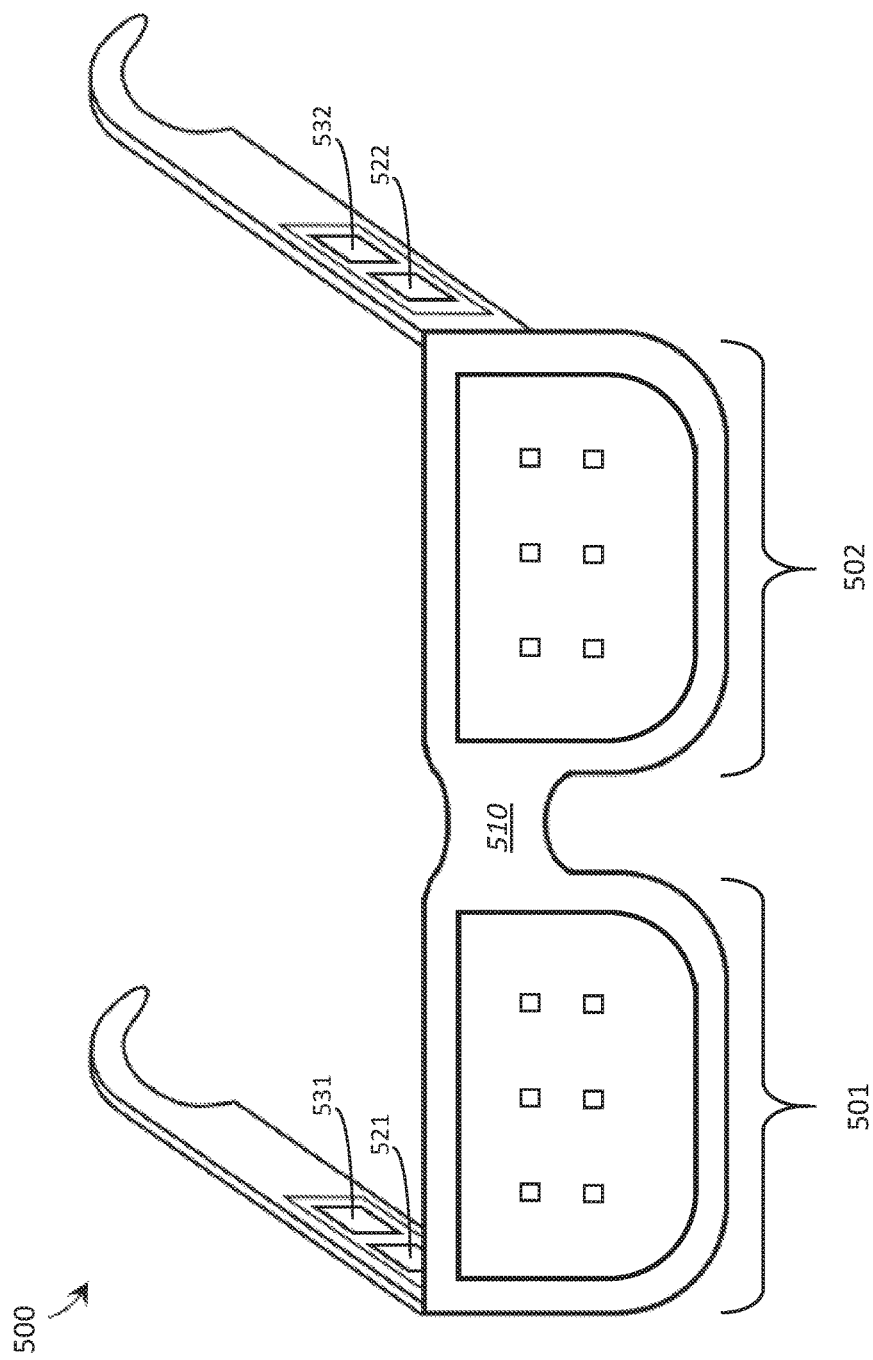
FIG. 5 is a perspective view of an exemplary wearable heads-up display employing two transparent display elements in accordance with the present systems, devices, and methods.

FIG. 5 is a perspective view of an exemplary wearable heads-up display 500 employing two transparent displays 501, 502 in accordance with an implementation of the present systems, devices, and methods. Each of displays 501, 502 may be substantially similar to any of displays 100, 200, 300, and/or 400 described previously. Wearable heads-up display 500 includes a support structure 510 having the general shape and appearance of a set of eyeglasses or sunglasses and that, in use, is worn on a head of a user so that first display 501 is positioned within a field of view of a first eye of the user and second display 502 is positioned within a field of view of a second eye of the user. When worn on the head of the user, the first and second light sources (not visible in the view of FIG. 5) and the first and light-redirection elements (also not visible in the view of FIG. 5) respectively corresponding to first and second displays 501 and 502 are preferably positioned near or beyond a periphery of the field of view of the corresponding eye of the user. First and second sets of dynamic reflectors (not called out in FIG. 5 to reduce clutter) are positioned on or proximate displays 501 and 502, respectively, within the field of view with the first and second eye of the user, respectively.

In order to control the content displayed on first transparent display 501, wearable heads-up display 500 includes a first processor 521 physically coupled to support structure 510 and communicatively coupled to both the first light source and the first set of dynamic reflectors of first display 501; and a first non-transitory processor-readable storage medium 531 physically coupled to support structure 510 and communicatively coupled to first processor 521. First non-transitory processor-readable storage medium 531 stores processor-executable instructions that, when executed by first processor 521, cause first processor 521 to: control the light provided by the first light source and control an angle/position/orientation of each dynamic reflector in the first set of dynamic reflectors of display 501. In some implementations, a single processor and a single non-transitory processor-readable storage medium may control the operations of both first display 501 and second display 502; however, in the illustrated example of FIG. 5, wearable heads-up display 500 includes a second processor 522 and a second non-transitory processor-readable storage medium 532 communicatively coupled thereto for controlling second display 502.

In some applications of wearable heads-up displays 500 that employ two transparent displays 501 and 502, both transparent displays 501 and 502 may simultaneously display visual content to the user. However, in other applications, it may be advantageous to rapidly alternate which of the two displays 501 and 502 is displaying content to the user while the other of displays 502 and 501 is in a state of maximal transparency. For example, in an application in which video is displayed to a user, all odd frames may be displayed on first display 501 while second display 502 is in a state of maximal transparency and all even frames may be displayed on second display 502 while first display 501 is in a state of maximal transparency. This approach can maximize the user's perception of light from external sources without noticeably detracting from the quality of the content displayed on displays 501 and 502. Similar techniques are employed in, for example, shutter-based 3D glasses.

In some applications of a wearable heads-up display, it may be advantageous for displayed content to be projected towards to a specific and limited region of the user's eye such that the displayed content may go in and out of the user's field of view depending on where the user is looking (i.e., the user will see the displayed content only if the user moves his/her pupil into the region where the displayed content is projected). For example, if all of the light signals generated by the wearable heads-up display are generally directed towards the top of the user's eye, then the user may only see the displayed content when the user glances upwards. Conversely, in other applications it may be advantageous for displayed content to remain visible to the user over a wide range of eye positions. In other words, it may be advantageous for the user to be able to see the displayed content regardless of where the user is looking (or, at least, when the user is looking in any of multiple different directions). The range of eye positions over which specific content is visible to the user is generally referred to as the "eyebox." An application in which displayed content is only visible from a single or small range of eye positions has a "small eyebox," and an application in which displayed content is visible form a wide range of eye positions has a "large eyebox."

Figure 6:
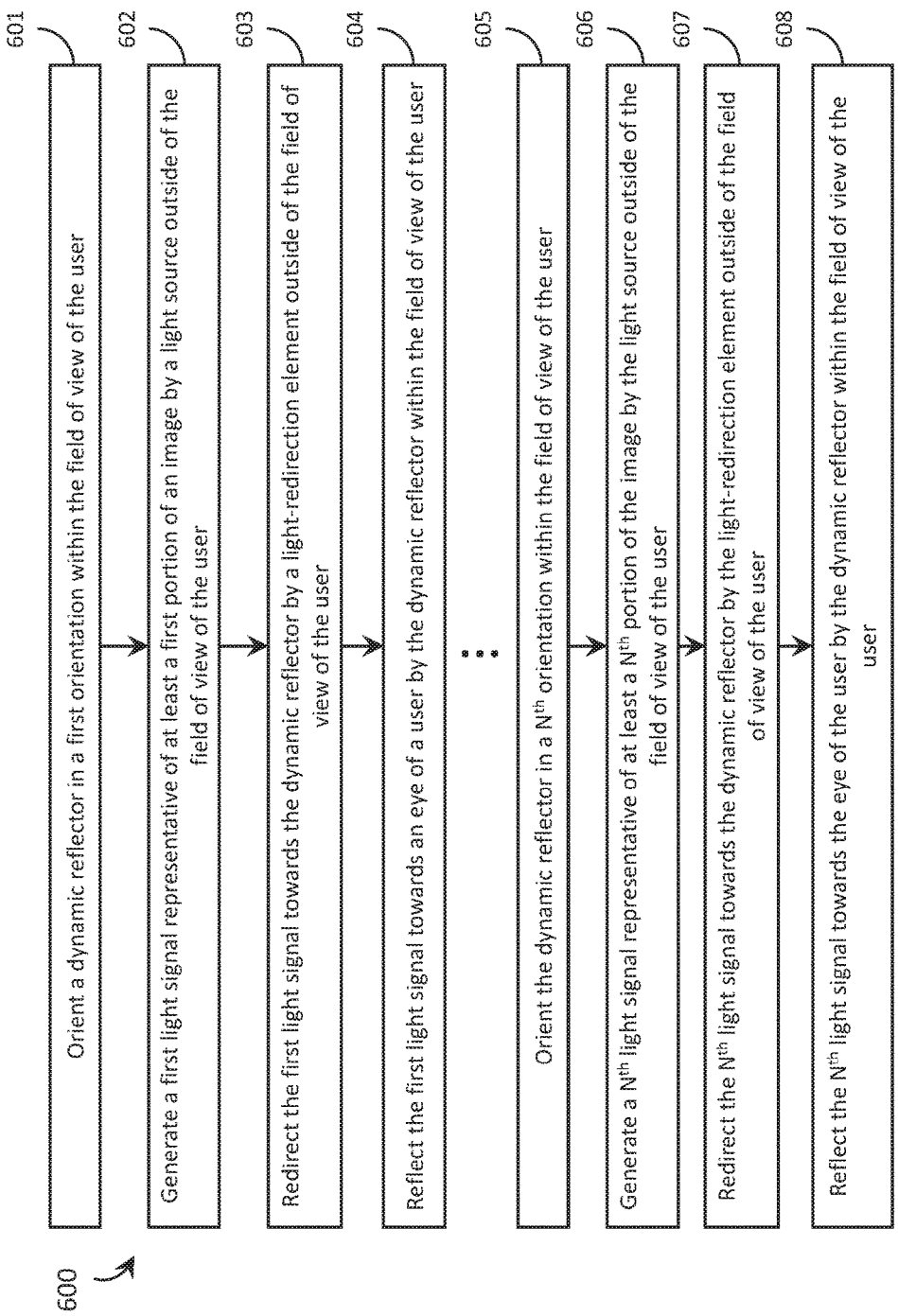
FIG. 6 is a flow-diagram showing a method of operating at least one transparent display element of a wearable heads-up display when the wearable heads-up display is worn on a head of a user in accordance with the present systems, devices, and methods.

FIG. 6 is a flow-diagram showing a method 600 of operating at least one transparent display of a wearable heads-up display when the wearable heads-up display is worn on a head of a user in accordance with the present systems, devices, and methods. Method 600 includes eight acts 601, 602, 603, 604, 605, 606, 607, and 608, though those of skill in the art will appreciate that in alternative embodiments certain acts may be omitted and/or additional acts may be added. In particular, as described in more details below, one or more repetitions of acts 601, 602, 603, and 604 may be included in between act 604 and 605 for one or more additional light signals representative of one or more additional portion(s) of an image. Those of skill in the art will also appreciate that the illustrated order of the acts is shown for exemplary purposes only and may change in alternative embodiments. For the purpose of method 600, the term "user" refers to a person that is wearing the wearable heads-up display (e.g., 500).

At 601, a dynamic reflector (e.g., 120, 220, 320, or any of 421, 422, 423, and/or 424) of the display is oriented in a first orientation (e.g., in a first rotational orientation) within the field of view of the user. The dynamic reflector may include, for example, a digital micromirror such as a MEMS-based micromirror and the orientation of the dynamic reflector may be controlled by, for example, a processor on-board the wearable heads-up display in response to the processor executing processor-executable instructions stored in a non-transitory processor-readable medium also located on-board the wearable heads-up display. The orientation of the dynamic reflector may be controllable in a single or multiple rotational dimensions depending on the implementation and the nature of the light source.

At 602, a light source (e.g., 110, 210, 310, or 410) generates and emits a first light signal representative of at least a first portion of an image. The first light source is positioned outside of the field of view of the user and may include one or more LED(s) and/or OLED(s) of any number of colors, and/or one or more laser device(s)/module(s). If the first light source is a point source (e.g., a laser) positioned on an arm of the support structure (e.g., as in FIG. 7), then the first portion of the image may include a first pixel of the image, or a modulated pattern corresponding to the pixels of a first row of an image.

At 603, light-redirection element (e.g., 130, 230, 330, or 430) outside of the user's field of view reflects the first light signal towards the dynamic reflector that is in the user's field of view.

At 604, the dynamic reflector within the field of view of the user reflects the first light signal towards the eye of the user and into the user's field of view so that the user sees the first light signal. The placement of the corresponding image in the user's field of view depends on the orientation of the dynamic reflector established at 601.

Acts 601, 602, 603, and 604 may be repeated sequentially for multiple light signals respectively corresponding to multiple portions of an image. For example, acts 601, 602, 603, and 604 may be repeated for a second light signal corresponding to a second portion of the image using a second orientation of the dynamic reflector. When the image includes N portions, where N is an integer greater than 2, method 600 may include, until i=(N+1), where i is an integer with an initial value of 3, sequentially: positioning the dynamic reflector in an $i^{th}$ orientation within the field of view of the user; generating an $i^{th}$ light signal representative of an $i^{th}$ portion of the image by the light source outside of the field of view of the user; redirecting the $i^{th}$ light signal towards the dynamic reflector by the light-redirection element outside of the field of view of the user; and reflecting the $i^{th}$ light signal towards the eye of the user by the dynamic reflector within the field of view of the user; and incrementing i by 1.

In general, method 600 may include sequentially repeating acts 601, 602, 603, and 604 for successive portions of the image until the $N^{th}$ or final portion of the image is reached. Once the $N^{th}$ or final portion of the image is reached, method 600 may proceed to act 605.

At 605, the dynamic reflector is positioned in a $N^{th}$ orientation similar to act 601.

At 606, the light source generates and emits an $N^{th}$ light signal representative of at least a $N^{th}$ portion of the image similar to act 602.

At 607, the light-redirection element redirects the $N^{th}$ light signal towards the dynamic reflector similar to act 603.

At 608, the dynamic reflector reflects the $N^{th}$ light signal towards the eye of the user similar to act 604.

As previously described, a user may be better able to focus on images displayed on the transparent displays described herein when employed in wearable heads-up displays if the light signals corresponding to the images are directed in substantially parallel beams. To this end, method 600 may include collimating the light signals by at least one collimator and/or the light-redirection element may be engineered to produce/output substantially collimated light when the light is redirected.

The wearable heads-up display may include a processor and a non-transitory processor-readable storage medium communicatively coupled to the processor that together control at least some of the acts of method 600. For example, method 600 may further include executing, by the processor on-board the wearable heads-up display, processor-executable instructions stored in the non-transitory processor-readable medium to: cause the processor to instruct the at least one light source to generate and emit the light signal representative of at least a portion of the image per act 602/606; and cause the processor to instruct the dynamic reflector to adopt the orientation per act 601/605.

As described previously and depicted in FIG. 4, the wearable heads-up displays of the present systems, devices, and methods may employ multiple dynamic reflectors, each mounted and spatially separated on or proximate the lens and in the field of view of the user when the user wears the heads-up display. Accordingly, the "dynamic reflector" referred to in method 600 may be interpreted as a "first dynamic reflector," and if the wearable heads-up display includes at least a second dynamic reflector then method 600 may be extended to include: configuring the light-redirection element in a first configuration, wherein: orienting the dynamic reflector in a first orientation within the field of view of the user includes orienting the first dynamic reflector in the first orientation within the field of view of the user; redirecting the first light signal towards the dynamic reflector by the light-redirection element outside of the field of view of the user includes redirecting the first light signal towards the first dynamic reflector by the light-redirection element outside of the field of view of the user while the light-redirection element is in the first configuration; and reflecting the first light signal towards an eye of the user by the dynamic reflector within the field of view of the user includes reflecting the first light signal towards the eye of the user by the first dynamic reflector within the field of view of the user; configuring the light-redirection element in a second configuration; orienting the second dynamic reflector in a first orientation within the field of view of the user; generating a second light signal representative of at least a portion of an image by the light source outside of the field of view of the user; redirecting the second light signal towards the second dynamic reflector by the light-redirection element outside of the field of view of the user while the light-redirection element is in the second configuration; and reflecting the second light signal towards the eye of the user by the second dynamic reflector within the field of view of the user.

As also depicted in FIG. 4, the wearable heads-up display may include an eye-tracker. In the case of a display that includes an eye-tracker and multiple dynamic reflectors, method 600 may be extended to include: determining a position of the eye of the user by the eye-tracker; and configuring the light-redirection element in either the first configuration in which light signals received from the light source by the light-redirection element are redirected towards the first dynamic reflector or the second configuration in which light signals received from the light source by the light-redirection element are redirected towards the second dynamic reflector based, at least in part, on the position of the eye of the user determined by the eye-tracker.

Each implementation of a wearable heads-up display described herein may be summarized as including a transparent near-eye display that can be integrated into a wearable display with the form factor of a regular pair of glasses.

Throughout this specification and the appended claims, reference is often made to "rotating" reflectors and reflectors being "oriented" at a particular "angle." A person of skill in the art (e.g., in the art of micromirrors such as digital MEMS-based micromirrors) will appreciate that the concept of "rotation" is used herein as a generalization and that a similar effect may be achieved by a bending or deformation of a micromirror surface.

In some implementations, one or more optical fiber(s) may be used to guide light signals along some of the paths illustrated herein. For example, light may travel from a light source to a first point of redirection (e.g., to a light-redirection element) through one or more optical fiber cable(s).

The wearable heads-up displays described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The wearable heads-up displays described herein may include one or more on-board power sources (e.g., one or more battery(ies)), a wireless transceiver for sending/receiving wireless communications, and/or a tethered connector port for coupling to a computer and/or charging the one or more on-board power source(s).

The wearable heads-up displays described herein may receive and respond to commands from the user in one or more of a variety of ways, including without limitation: voice commands through a microphone; touch commands through buttons, switches, or a touch sensitive surface; and/or gesture-based commands through gesture detection systems.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, U.S. patent application Ser. No. 14/749, 351 and U.S. Provisional Patent Application Ser. No. 62/017,089 are incorporated herein by reference, in their entirety. Aspects of the embodiments can be modified, if necessary, to employ systems, circuits and concepts of U.S. patent application Ser. No. 14/749,351 and U.S. Provisional Patent Application Ser. No. 62/017,089 to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display comprising:
   a support structure that in use is worn on a head of a user;
   a transparent element that is physically coupled to the support structure, wherein the transparent element is positioned within a field of view of the user when the support structure is worn on the head of the user;
   a light source physically coupled to the support structure and positioned near or beyond a field of view of the user when the support structure is worn on the head of the user;
   a light-redirection element physically coupled to the support structure and positioned to receive light signals provided by the light source and redirect the light signals towards the transparent element; and
   a dynamic refractor positioned on the transparent element in the field of view of the user when the support structure is worn on the head of the user, wherein the dynamic refractor receives light signals redirected by the light-redirection element, and wherein the dynamic refractor is controllably variable by rotation about at least two orthogonal axes to redirect the light signals towards select regions of at least one eye of the user.

2. The WHUD of claim 1 wherein the light-redirection element redirects light towards the dynamic refractor by reflection.

3. The WHUD of claim 1 wherein the light-redirection element redirects light towards the dynamic refractor by refraction.

4. The WHUD of claim 1 wherein the light-redirection element redirects light towards the dynamic refractor by diffraction.

5. The WHUD of claim 1 wherein the light-redirection element is selected from a group consisting of: a reflector, a refractor, a diffractor, a mirror, a half silvered mirror, a dichroic filter, and a prism.

6. The wearable heads-up display of claim 1 wherein the support structure has a general shape and appearance of an eyeglasses frame.

7. The wearable heads-up display of claim 1, further comprising:
   a processor physically coupled to the support structure and communicatively coupled to at least the light source and the dynamic refractor; and
   a non-transitory processor-readable storage medium physically coupled to the support structure and communicatively coupled to the processor, wherein the non-transitory processor-readable storage medium stores processor-executable instructions that, when executed by the processor, cause the processor to:
   control the light signals provided by the light source; and
   control the dynamic refractor to reflect the light signals provided by the light source towards select regions of at least one eye of the user.

8. The wearable heads-up display of claim 1 wherein the dynamic-refractor includes a digital microelectromechanical system (MEMS) micromirror.

* * * * *